(12) United States Patent
Lin

(10) Patent No.: US 8,777,116 B2
(45) Date of Patent: Jul. 15, 2014

(54) DISPLAY-ENABLED CARD WITH SECURITY AUTHENTICATION FUNCTION

(71) Applicant: Smartdisplayer Technology Co., Ltd., New Taipei (TW)

(72) Inventor: Lee Chung Lin, New Taipei (TW)

(73) Assignee: Smartdisplayer Technology Co., Ltd., New Taipei (TW)

( * ) Notice: Subject to any disclaimer, the term of this patent is extended or adjusted under 35 U.S.C. 154(b) by 0 days.

(21) Appl. No.: 13/659,415

(22) Filed: Oct. 24, 2012

(65) Prior Publication Data

US 2013/0277434 A1    Oct. 24, 2013

(30) Foreign Application Priority Data

Apr. 20, 2012 (TW) .............................. 101114064 A

(51) Int. Cl.
 *G06K 19/073* (2006.01)
(52) U.S. Cl.
 USPC ............. 235/492; 235/379; 235/380; 705/71; 705/72
(58) Field of Classification Search
 USPC ................... 235/492, 379, 380; 705/71, 72
 See application file for complete search history.

(56) References Cited

U.S. PATENT DOCUMENTS

| 5,907,142 | A  * | 5/1999  | Kelsey ........................... 235/380 |
| 8,370,254 | B1 * | 2/2013  | Hopkins et al. .................. 705/39 |
| 2006/0278697 | A1 * | 12/2006 | Lovett ............................ 235/380 |
| 2007/0073619 | A1 * | 3/2007  | Smith ............................. 705/41 |
| 2009/0037275 | A1 * | 2/2009  | Pollio ............................ 705/14 |
| 2012/0024945 | A1 * | 2/2012  | Jones ............................ 235/379 |
| 2012/0145769 | A1 * | 6/2012  | Whitfield et al. ............... 228/41 |
| 2012/0318863 | A1 * | 12/2012 | Kim .............................. 235/380 |
| 2013/0112756 | A1 * | 5/2013  | Poidomani et al. ........... 235/492 |

* cited by examiner

*Primary Examiner* — Allyson Trail
(74) *Attorney, Agent, or Firm* — Rabin & Berdo, P.C.

(57) ABSTRACT

A display-enabled card with security authentication function includes a flexible card structure internally provided with a flexible electronic system, which includes a flexible display, a power supply module for supplying a DC voltage, a driving control module having a DC voltage converter for converting the DC voltage into a first driving voltage; a smart IC connected to the driving control module, a communication module connected to and working with the smart IC to perform security authentication, and a power management module arranged between the power supply module, the driving control module and the smart IC to provide the DC voltage to the driving control module and convert the DC voltage into a second driving voltage. The driving control module directly reads data stored in the smart IC and drives the flexible display to show the read data, so as to avoid poor sensing or data communication due to unstable voltage.

13 Claims, 5 Drawing Sheets

US 8,777,116 B2

DISPLAY-ENABLED CARD WITH SECURITY AUTHENTICATION FUNCTION

FIELD OF THE INVENTION

The present invention relates to a flexible card with security authentication function, and more particularly, to a display-enabled card that is able to actively read data stored on a smart integrated circuit (IC) for displaying on the card and includes a power management module for providing power supply to the smart IC under control.

BACKGROUND OF THE INVENTION

Owing to the progress in various technological fields, integrated circuit (IC) cards, such as credit cards, cash cards, phone cards, stored-value cards and the like, have been used in many transactions as means of payment. According to the data access and data reading interfaces thereof, the currently available IC cards can be generally classified into three types, namely, IC cards with a contact type interface, IC cards with a non-contact type interface, and IC cards with a hybrid-type interface.

An IC card with a contact type interface, such as a general cash card, enables data access via metal contacts. An IC card with a non-contact interface, such as a stored-value card or electronic wallet often used for mass transit, enables data access via a sensor. Since various kinds of cards have been introduced into the market, the IC card with a hybrid-type interface is developed to integrate the functions of credit card, cash card, electronic wallet, stored-value card and the like into one single IC card, allowing a user to get diversified services with only one card.

Conventional electronic smart cards have not a display function, and a card holder can know the data stored in the card, such as the balance, only via printed bills or a card reader. To overcome this disadvantage, an IC card with display has been developed to allow a user to look up the data stored in the card in real time.

FIG. 1 is a block diagram of a first conventional IC card with display. As shown, the first conventional IC card includes a display 10, a communication interface 11, a microprocessor 12, a display driving circuit 13, a boost circuit 14, a rectifying regulator circuit 15, and a non-volatile readable memory 16. The microprocessor 12, after receiving a signal from the communication interface 11, can store data in the non-volatile readable memory 16, and the display driving circuit 13 converts the data into a driving signal of the display 10. Meanwhile, the boost circuit 14 converts a direct current (DC) power generated by the rectifying regulator circuit 15 into a driving voltage of the display 10, so that a user can look up data directly on the display 10. In addition, the microprocessor 12 can also transmit a response signal to an external card reader through the communication interface 11.

The conventional communication interface 11 is a combination of a non-contact type radio frequency (RF) smart card IC 17 and a contact type smart card IC 18. The IC card obtains required driving power from the non-contact type RF smart card IC 17 or the contact type smart card IC 18.

The non-contact type RF smart card IC 17 is internally provided with an antenna 19, which receives an RF signal generated by an external card reader. The communication interface 11 performs RF demodulation for the coupled signal. On the other hand, the coupled signal passes the rectifying regulator circuit 15 to generate a DC power for supplying an internally needed voltage of the IC card. The contact type smart card IC 18 receives a digital serial signal from an external card reader and decodes the received digital serial signal for reading by the microprocessor 12. The external card reader also provides via the contact type smart card IC 18 a DC power for use by all internal circuits of the IC card.

Since the first conventional IC card does not include any power generator, it must rely on an induced current generated by the received external signal. The induced current is supplied to the boost circuit 14 and the rectifying regulator circuit 15 to enable data communication and data display. The user could not get the data in the IC card without a card reader, so that the first conventional display-enabled card is not so convenient in use.

A second conventional IC card as shown in FIG. 2 has been developed and introduced into the market in an attempt to overcome the disadvantages of the above-mentioned first conventional IC card. Please refer to FIG. 2. The second conventional IC card includes a flexible display 20, a display circuit 21, a communication interface 22, a smart card IC 23, and a power generator 24. The display circuit 21 is connected to the flexible display 20; and the communication interface 22 is connected to the display circuit 21 via the smart card IC 23. The smart card IC 23 performs a security authentication, so that data communication between the communication interface 22 and the display circuit 21 via the smart card IC 23 is allowed only when the security authentication succeeds.

The display circuit 21 includes a display driver 211 for driving the flexible display 20 and a display controller 212 for controlling the display driver 211. The display driver 211 is connected to the flexible display 20 while the display controller 212 is connected to the display driver 211 and the smart card IC 23. In addition, the smart card IC 23 includes a security module 231 and a storage unit 232. The security module 231 performs the security authentication to protect the IC card against a hacker; and data stored in the storage unit 232 can be accessed only when the security authentication succeeds. Further, the power generator 24 is connected to the display circuit 21, the communication interface 22 and the smart card IC 23 to supply the IC card with required working voltage via the RF signal received by the communication interface 22.

In the second conventional IC card, it is the RF signal received by the communication interface that drives the power generator in the IC card to generate the required working voltage. That is, according to the second conventional IC card, an external card reader is still needed for generating the required working voltage to enable data display, and a user just could not get data stored in the IC card without an external card reader. Moreover, the working voltage supplied by the built-in power generator is often unstable to result in poor sensing ability or poor data communication. It is therefore necessary to work out an improved display-enabled flexible IC card in order to overcome the above disadvantages of the conventional IC cards with display.

SUMMARY OF THE INVENTION

A primary object of the present invention is to provide a display-enabled card with security authentication function, of which a driving control module can directly read out data stored in a smart IC for displaying on a display screen on a surface of the card, so that a user can obtain in real time the data stored in the smart IC without the need of an external device and the display-enabled card can have effectively upgraded usability.

Another object of the present invention is to provide a display-enabled card with security authentication function, of which a flexible display and a smart IC are independently supplied with the required driving voltage to avoid the problem of poor card sensing ability due to unstable voltage supply and accordingly, extend the card service life.

To achieve the above and other objects, the display-enabled card with security authentication function according to the present invention includes a flexible card structure internally provided with a flexible electronic system for performing security authentication.

In a preferred embodiment, the flexible electronic system includes a flexible display, a power supply module, a driving control module, a smart IC, a communication module, and a power management module.

The flexible display includes a display screen provided on a surface of the card structure; the power supply module supplies a DC voltage; the driving control module includes a first DC voltage converter for converting the DC voltage supplied by the power supply module into a first driving voltage needed by the flexible display; the smart IC is connected to the driving control module; the communication module is connected to and working with the smart IC to perform a security authentication, such that a two-way data access between the communication module and the smart IC is allowed only when the security authentication succeeds; and the power management module is arranged between the smart IC, the power supply module and the driving control module to provide the DC voltage supplied by the power supply module directly to the driving control module. The power management module also includes a second DC voltage converter for converting the DC voltage supplied by the power supply module into a second driving voltage needed by the smart IC.

Further, the power management module controls the power supply module to supply the DC voltage only when the driving control module and the smart IC are reading data, so as to avoid an electrical leakage at the smart IC.

According to the present invention, the driving control module directly reads out data stored in the smart IC and drives the flexible display to show the read data on the display screen. In an operable embodiment, the communication module is temporarily isolated by the smart IC when the driving control module is reading data from the smart IC and transmits the read data to the flexible display; and similarly, the driving control module is temporarily isolated by the smart IC during data access between the smart IC and the communication module.

The driving control module further includes a driver connected to the first DC voltage converter; and a controller connected to the driver and the smart IC for controlling the reading of the data stored in the smart IC and transmitting the read data to the driver, so that the driver is able to drive the flexible display to show the read data on the display screen.

According to the present invention, the communication module is located on the surface of the card structure to form a contact type communication means. In an operable embodiment, the contact type communication means is a metal contact chip, which has a plurality of metal contacts for contacting with an external device for data transmission.

Alternatively, the communication module is embedded in the card structure to form a non-contact type communication means. In an operable embodiment, the non-contact type communication means is an antenna for receiving and/or generating a radio frequency (RF) signal for data transmission.

Alternatively, the communication module forms a hybrid communication means on the card structure. In an operable embodiment, the hybrid communication means includes a metal contact chip provided on the surface of the card structure and an antenna embedded in the card structure, so that the display-enabled card of the present invention provides two different data transmission manners and can be used in different conditions.

The flexible electronic system further includes an input module connected to the driving control module and having at least one input interface provided on the surface of the card structure. In an operable embodiment, the input interface can be a push-button mechanism or a touch sensor panel without being particularly limited thereto.

According to an embodiment of the present invention, the power management module and the driving control module are integrated into one single integrated circuit; and in another embodiment, the power management module and the smart IC are integrated into one single integrated circuit.

The present invention is characterized in that the driving control module includes a first DC voltage converter for converting the DC voltage supplied by the power supply module into a first driving voltage needed by the flexible display, and the power management module includes a second DC voltage converter for converting the DC voltage supplied by the power supply module into a second driving voltage needed by the smart IC. That is, the driving power needed by the smart IC and the driving control module is directly provided by the power supply module without the need of receiving a signal from the communication module and converting the signal into required working voltage. Therefore, the undesired condition of poor sensing ability due to unstable voltage supply as found in the conventional display-enabled cards can be effectively avoided to prolong the card service life.

Further, since the card structure is able to independently provide the driving voltage needed by the smart IC and the driving control module, the display-enabled card of the present invention has effectively upgraded usability because the communication module thereof needs not to receive any signal or instruction provided by other external device and a user is allowed to immediately get the data currently stored in the display-enabled card.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
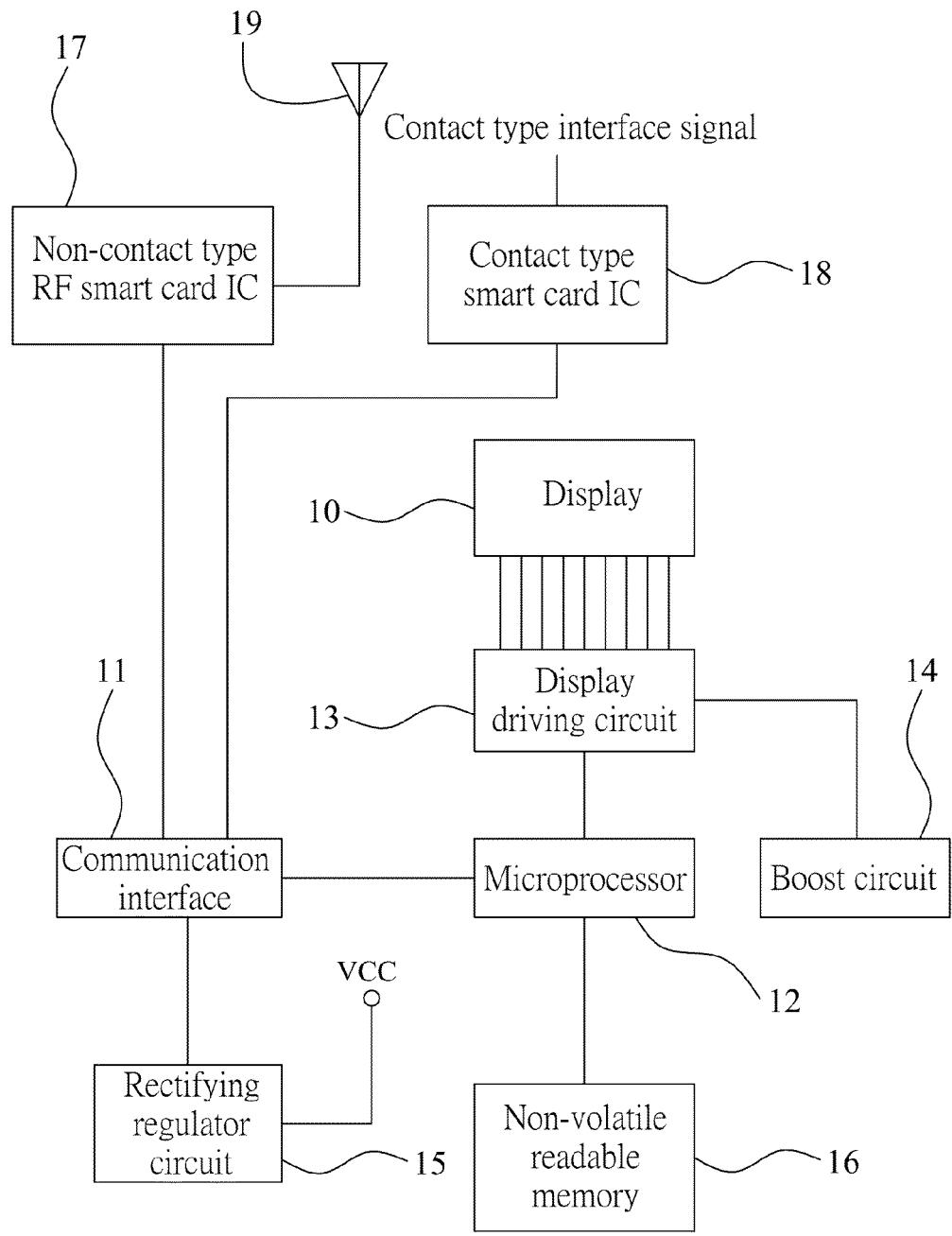
FIG. 1 is a block diagram showing internal circuits of a first conventional display-enabled flexible card.
Figure 2:
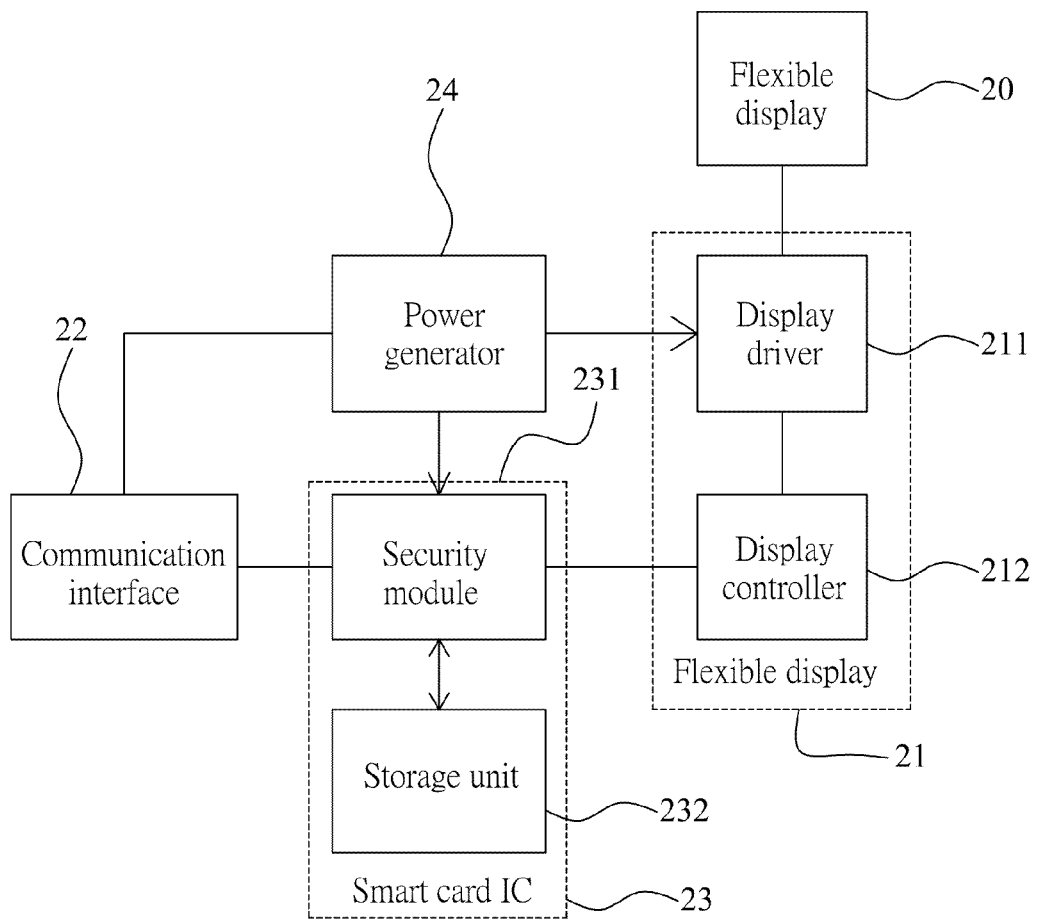
FIG. 2 is a block diagram showing internal circuits of a second conventional display-enabled flexible card.

The present invention will now be described with some preferred embodiments thereof and with reference to the accompanying drawings. For the purpose of easy to understand, elements that are the same in the preferred embodiments are denoted by the same reference numerals.

Figure 3:
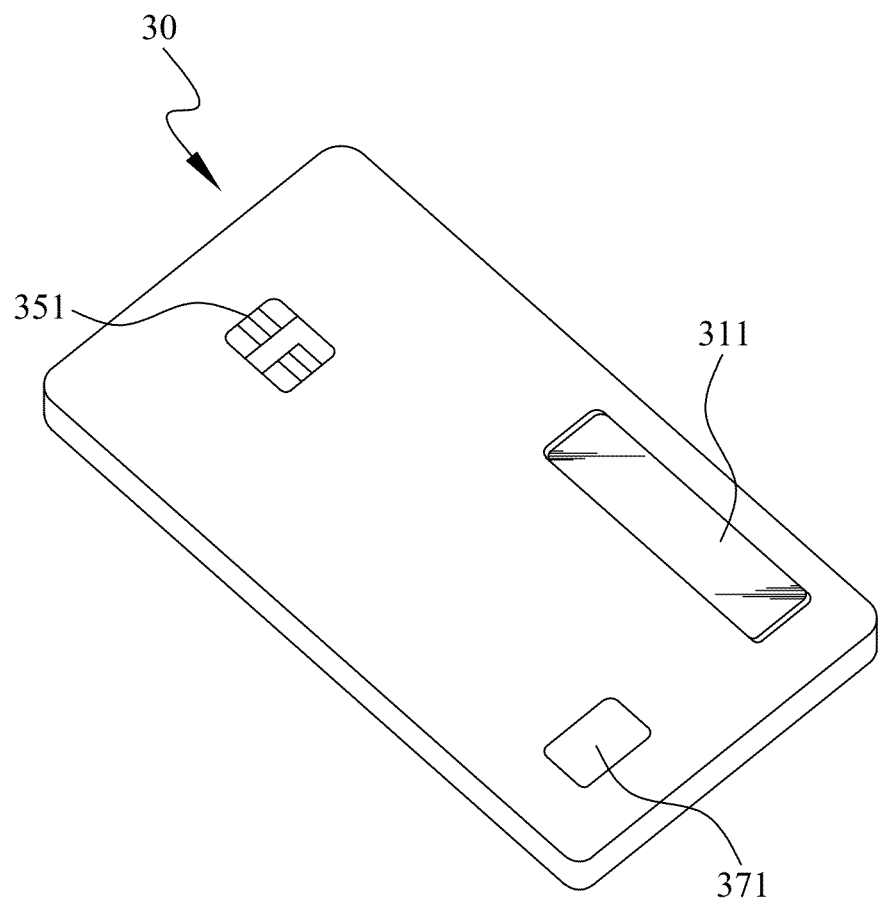
FIG. 3 is a perspective view of a display-enabled card according to a first embodiment of the present invention, which has a contact type communication means.

Please refer to FIG. 3 that is a perspective view of a display-enabled card with security authentication function according to a first preferred embodiment of the present invention. As shown, the display-enabled card includes a flexible card structure 30, which has a display screen 311, a metal contact chip 351 and an input interface 371 provided on a surface thereof, and is internally provided with a flexible electronic system capable of performing security authentication.

Figure 4:
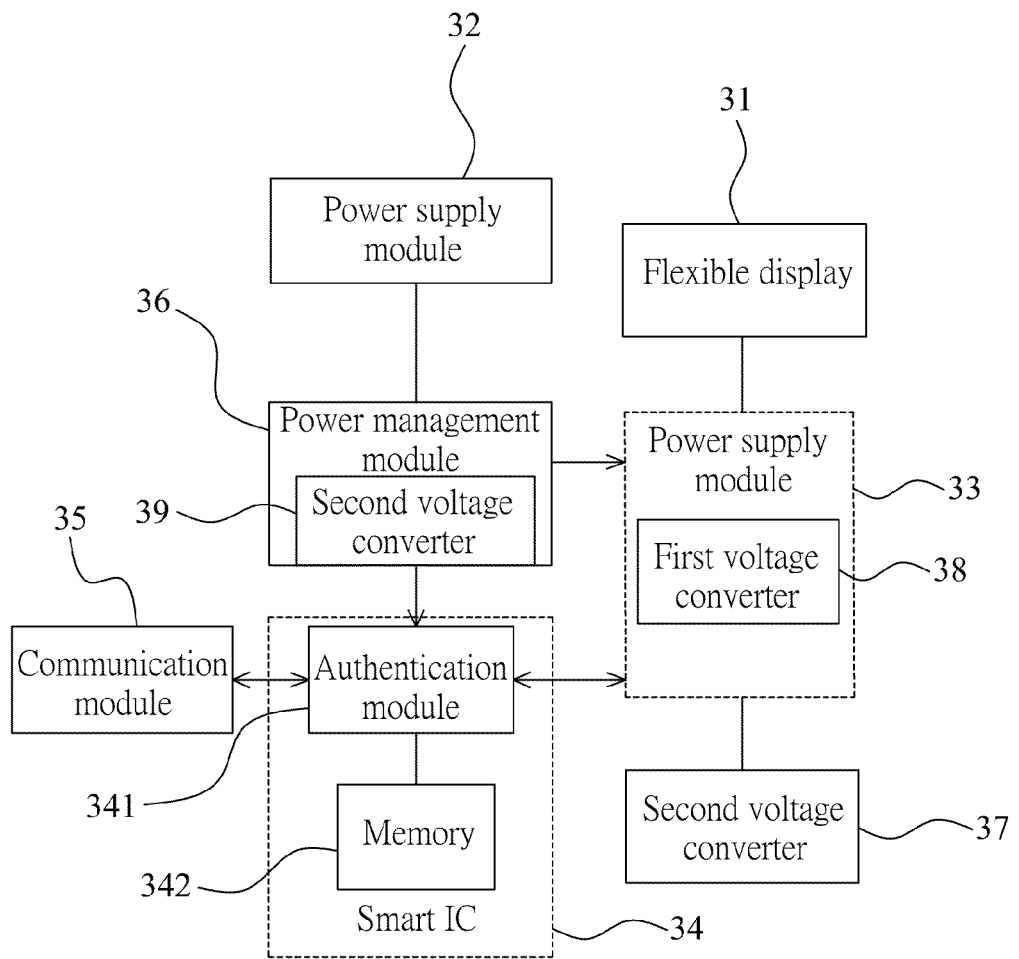
FIG. 4 is a block diagram showing internal circuits of the display-enabled card according to the present invention.

FIG. 4 is a block diagram showing the flexible electronic system in the fixable card structure 30 of the display-enabled card according to the present invention. As shown, the flexible electronic system includes a flexible display 31, a power supply module 32, a driving control module 33, a smart integrated circuit (IC) 34, a communication module 35, a power management module 36, and an input module 37.

The flexible display 31 is connected to the driving control module 33, the power supply module 32 is connected to the power management module 36, the driving control module 33 is also connected to the power management module 36 and the smart IC 34, and the smart IC 34 is also connected to the power management module 36 and the communication module 35. And, the input module 37 is connected to the driving control module 33.

The flexible display 31 forms the display screen 311 on the surface of the card structure 30, and relevant data stored in the display-enabled card can be shown on the display screen 311. The power supply module 32 is built in the card structure 30 for supplying a direct-current (DC) voltage. In an operable embodiment, the power supply module 32 can be a battery.

The driving control module 33 includes a first DC voltage converter 38 for converting the DC voltage received from the power supply module 32 into a first driving voltage needed by the flexible display 31 and supplying the first driving voltage to the flexible display 31. In an operable embodiment, the driving control module 33 includes a driver and a controller (not shown). The driver is connected to the first DC voltage converter 38, and the controller is connected to the driver and the smart IC 34 for controlling reading of data stored in the smart IC 34 and transmitting the read-out data to the driver, so that the driver can drive the flexible display 31 to show the read data on the display screen 311.

According to the present invention, the smart IC 34 works with the communication module 35 to together perform a security authentication, and a two-way data access between the smart IC 34 and the communication module 35 is allowed only when the security authentication succeeds. In an operable embodiment, the smart IC 34 includes an authentication module 341 for performing the security authentication and a memory 342 for storing relevant data. When the security authentication succeeds, the authentication module 341 diverts the communication module 35 to the memory 342, so that the communication module 35 can access or update the data in the memory 342. On the other hand, when the security authentication fails, the authentication module 341 will deny any instruction or request from the communication module 35.

The smart IC 34 is also connected to the driving control module 33, and the driving control module 33 can directly read out data stored in the smart IC 34 and drive the flexible display 31 to directly show the read-out data on the display screen 311.

In the illustrated first embodiment of the present invention, the communication module 35 includes the metal contact chip 351, which is provided on the surface of the card structure 30, as shown in FIG. 3, to serve as a contact-type communication means. The metal contact chip 351 includes a plurality of metal contacts for contacting with an external device for data transmission. However, it is understood the first embodiment is only illustrative to enable convenient description of the present invention and not intended to restrict the design of the communication module 35 in any way.

When the driving control module 33 is reading data from the smart IC 34, the communication module 35 is temporarily isolated by the smart IC 34. On the other hand, during data access between the smart IC 34 and the communication module 35, the driving control module 33 is temporarily isolated by the smart IC 34.

The DC voltage supplied by the power supply module 32 is transmitted by the power management module 36 directly to the driving control module 33, and the driving control module 33 receiving the DC voltage is automatically boosted. The power management module 36 includes a second DC voltage converter 39 for converting the DC voltage received from the power supply module 32 into a second driving voltage needed by the smart IC 34, and supplying the second driving voltage to the smart IC 34.

Further, the power management module 36 controls the power supply module 32 to supply the DC voltage only when the driving control module 33 and the smart IC 34 are reading data, so as to avoid an electrical leakage at the smart IC 34.

The input module 37 includes the input interface 371, which is located on the surface of the card structure 30. In an operable embodiment, the input interface 371 can be a push-button mechanism. It is understood the first embodiment is only illustrative and not intended to restrict the present invention in any way. That is, there can be more than one input interface 371 provided on the surface of the card structure 30.

With the above arrangements, the display-enabled card of the present invention has two built-in voltage converters for independently supplying two different driving voltages to the driving control module 33 and the smart IC 34. In this manner, it is able to overcome the problem in the conventional display-enabled flexible cards as having unstable voltage supply to result in poor sensing ability of the IC card. Further, in the present invention, the driving control module 33 directly reads out the data stored in the smart IC 34 and drives the flexible display 31 to show the read-out data on the display screen 311.

Figure 5:
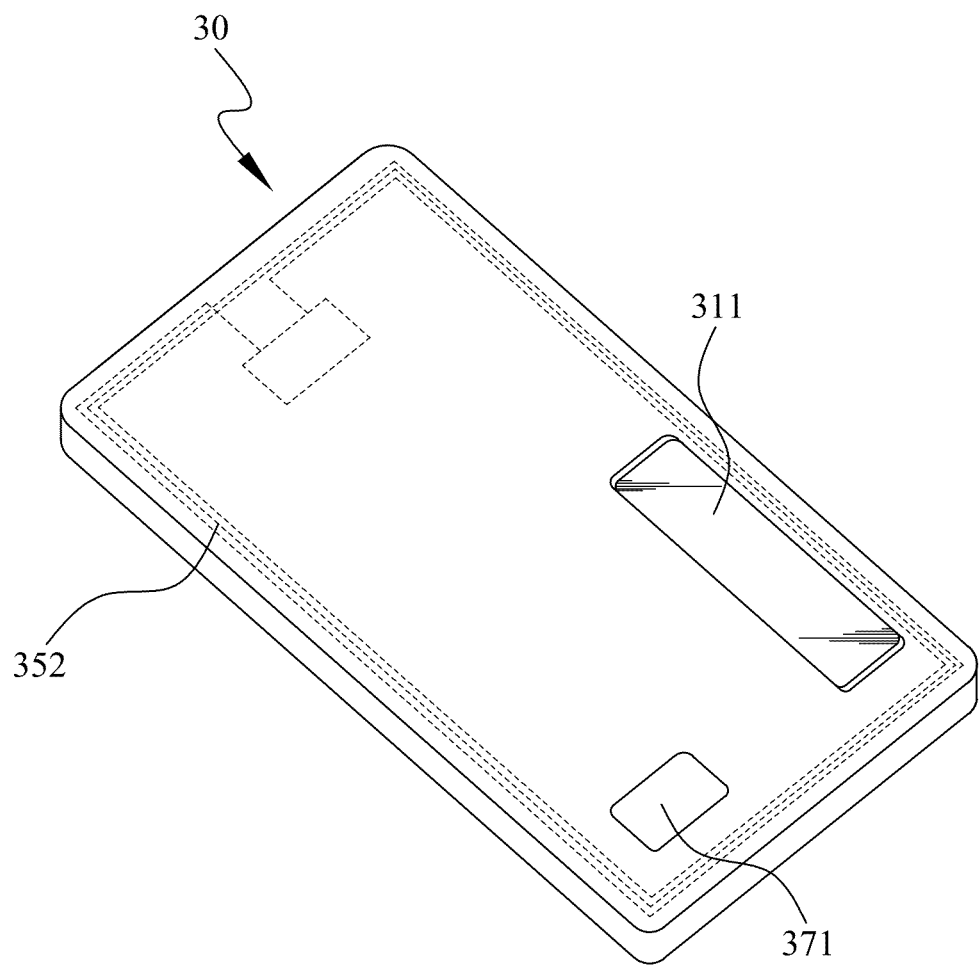
FIG. 5 is a perspective view of a display-enabled card according to a second embodiment of the present invention, which has a non-contact type communication means.

Please refer to FIG. 5 that is a perspective view of a display-enabled card according to a second preferred embodiment of the present invention. Like the first preferred embodiment, the second embodiment also includes a flexible card structure 30, which has a display screen 311 and an input interface 371 provided on a surface thereof, and is internally provided with a flexible electronic system capable of performing security authentication.

The second preferred embodiment is different from the first preferred embodiment only in the communication module 35 and the input module 37 of the flexible electronic system. That is, the second preferred embodiment has a flexible display 31, a power supply module 32, a driving control module 33, a smart IC 34, and a power management module 36 identical to those in the first preferred embodiment. Therefore, these identical parts are not repeatedly described herein.

As can be seen in FIG. 5, the communication module 35 in the second preferred embodiment includes an antenna 352 embedded in the card structure 30 to serve as a non-contact type communication means. The antenna 352 receives and/or generates a radio frequency (RF) signal for data transmission. The input module 37 is connected to the driving control module 33 and includes the input interface 371, which is provided on the surface of the card structure 30 and can be a touch sensor panel.

Again, it is understood the second preferred embodiment is only illustrative to enable convenient description of the present invention and not intended to restrict the design of the communication module 35 in any way. For example, the communication module 35 can be otherwise a hybrid communication means (not shown) that combines a contact type means, such as the metal contact chip 351, and a non-contact type communication means, such as the embedded antenna 352, so that the display-enabled card of the present invention can provide two different data transmission manners to enable widened applications or range of use thereof.

According to the present invention, the power management module 36 and the driving control module 33 can be integrated into one single integrated circuit; or alternatively, the power management module 36 and the smart IC 34 can be integrated into one single integrated circuit; so that the whole flexible electronic system can have a further reduced circuit volume.

In conclusion, the present invention effectively upgrades the usability of a display-enabled card because the communication module thereof needs not to receive any signal or instruction provided by other external device and a user is allowed to immediately get the data currently stored in the display-enabled card without an external card reader. Further, since the smart IC and the driving control module directly obtain their required driving power from two independent DC voltage converters, it is able to avoid the problem of poor sensing ability of the card due to unstable voltage supply and accordingly, extend the card service life.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A display-enabled card with a security authentication function, comprising:
   a flexible card structure internally provided with a flexible electronic system capable of performing security authentication; the flexible electronic system including:
   a flexible display including a display screen provided on a surface of the card structure;
   a power supply module for supplying a DC voltage;
   a driving control module including a first DC voltage converter for converting the DC voltage supplied by the power supply module into a first driving voltage needed by the flexible display;
   a smart IC connected to the driving control module;
   a communication module connected to and working with the smart IC to perform the security authentication, such that a two-way data access between the communication module and the smart IC is allowed only when the security authentication succeeds;
   a power management module arranged between the smart IC, the power supply module and the driving control module to provide the DC voltage supplied by the power supply module directly to the driving control module, the power management module including a second DC voltage converter for converting the DC voltage supplied by the power supply module into a second driving voltage needed by the smart IC; and
   an input module connected to the driving control module, the input module including at least one input interface located on the surface of the card structure,
   wherein the driving control module directly reads out data stored in the smart IC and drives the flexible display to show the read-out data on the display screen.

2. The display-enabled card with a security authentication function as claimed in claim 1, wherein the driving control module further includes:
   a driver connected to the first DC voltage converter; and
   a controller connected to the driver and the smart IC for controlling the reading of the data stored in the smart IC and transmitting the read-out data to the driver, so that the driver is able to drive the flexible display to show the read-out data on the display screen.

3. The display-enabled card with a security authentication function as claimed in claim 1, wherein the power management module supplies the DC voltage to the driving control module and the smart IC only when they are reading data.

4. The display-enabled card with a security authentication function as claimed in claim 1, wherein the communication module and the smart IC are temporarily isolated from each other when the driving control module is reading out data from the smart IC and transmitting the read-out data to the flexible display, and the driving control module and the smart IC are temporarily isolated from each other during data access between the smart IC and the communication module.

5. The display-enabled card with a security authentication function as claimed in claim 1, wherein the communication module is located on the surface of the card structure to form a contact type communication means.

6. The display-enabled card with a security authentication function as claimed in claim 5, wherein the contact type communication means includes a metal contact chip.

7. The display-enabled card with a security authentication function as claimed in claim 1, wherein the communication module is embedded in the card structure to form a non-contact type communication means.

8. The display-enabled card with a security authentication function as claimed in claim 7, wherein the non-contact type communication means includes an antenna.

9. The display-enabled card with a security authentication function as claimed in claim 1, wherein the communication module forms a hybrid communication means on the card structure.

10. The display-enabled card with a security authentication function as claimed in claim 9, wherein the hybrid communication means includes a metal contact chip provided on the surface of the card structure and an antenna embedded in the card structure.

11. The display-enabled card with a security authentication function as claimed in claim 1, wherein the input interface is selected from the group consisting of a push-button mechanism and a touch sensor panel.

12. The display-enabled card with a security authentication function as claimed in claim 1, wherein the power management module and the driving control module are integrated into one single integrated circuit.

13. The display-enabled card with a security authentication function as claimed in claim 1, wherein the power management module and the smart IC are integrated into one single integrated circuit.

* * * * *